May 16, 1944.   F. P. DE WILDE   2,348,963
AUTOMOBILE SAFETY SYSTEM
Filed Aug. 18, 1941
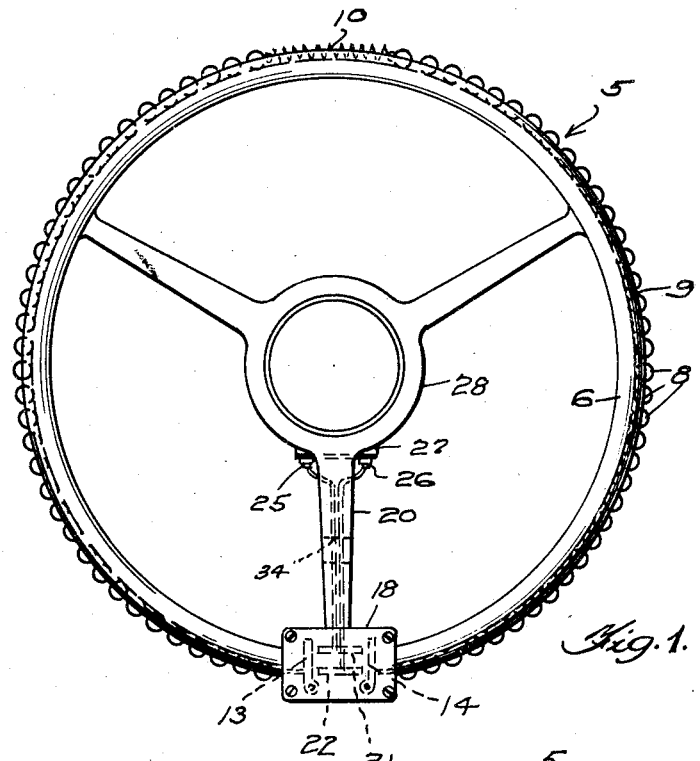
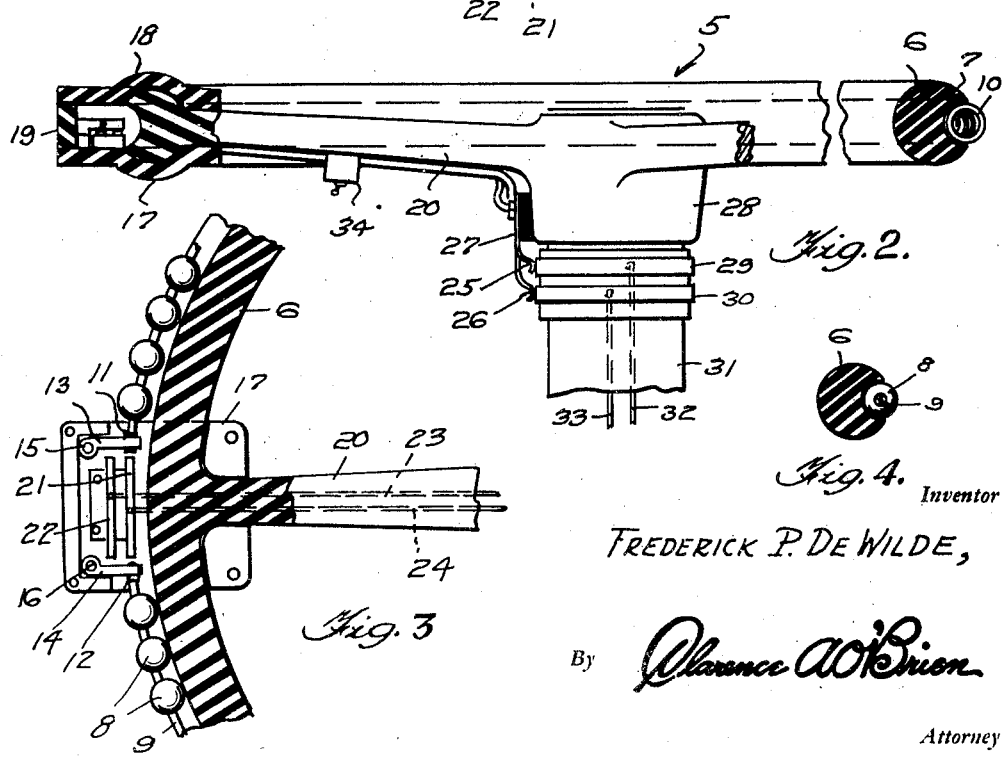
Inventor
FREDERICK P. DE WILDE,
By Clarence A. O'Brien
Attorney Patented May 16, 1944

2,348,963

UNITED STATES PATENT OFFICE 2,348,963

AUTOMOBILE SAFETY SYSTEM

Frederick P. De Wilde, El Cajon, Calif., assignor to Verona M. De Wilde, El Cajon, Calif.

Application August 18, 1941, Serial No. 407,383

1 Claim. (Cl. 200—59)

My invention relates to improvements in switch means applicable to the steering components of an automobile for the purpose of rendering the automobile inoperative in the event of the driver releasing his grip on the steering wheel, or, falling asleep at the wheel, and the primary object of my invention is to provide a simplified and efficient arrangement of the character indicated.

Other important objects and advantages of my invention will be apparent from a reading of the following description taken in connection with the appended drawing, wherein for purposes of illustration I have shown a preferred embodiment of my invention.

In the drawing:

Figure 1 is a top plan view of a steering wheel.

Figure 2 is an enlarged fragmentary sectional elevational view of a steering wheel.

Figure 3 is a fragmentary horizontal sectional view taken through the left hand portion of Figure 2.

Figure 4 is a transverse vertical sectional view taken through the rim portion of the steering wheel.

Referring in detail to the drawing, and first to Figures 1 through 4 thereof, the numeral 5 generally designates the special steering wheel switch arrangement in accordance with the present invention, the same comprising an otherwise conventional form of steering wheel having a rim 6 modified by a peripheral semi-circular channel 7, in which channel are arranged balls 8 which are strung like beads on a spring wire 9 which is interrupted at the part of the steering wheel remote from the driver by a helical tensioning spring 10 which draws adjacent terminals of the wire toward each other. The remaining terminals of the wire 9 are respectively connected as indicated in Figure 3 of the drawing at 11 and 12 with the free ends of contactors 13 and 14 which are pivoted as indicated by the numerals 15 and 16 on a base 17 which underlies the adjacent portion of the steering wheel rim and has a correspondingly shaped upper plate 18, the base 17 and the plate 18 being spaced at their radially outward parts by the enclosing wall 19, the base and the plate being traversed by suitable stubs or bolts to clamp the upper and lower sections thereof against the top and bottom of the steering wheel rim and steering wheel spoke 20 as indicated in Figures 2 and 3 of the drawing. The steering wheel 6, base 17, upper plate 18 and wall 19, are formed of any suitable insulation material. The tension of the contractile spring 10 normally keeps the contactors 13 and 14 away from the elongated parallel contacts 21 and 22 from which respective wires 23 and 24 lead under the spoke 20 to corresponding brushes 25 and 26 which are mounted on a suitable dielectric block 27 secured to the hub 28 of the steering wheel, the said brushes constantly bearing against contact rings 29 and 30 secured to and insulated from the steering post 31 below the steering wheel as shown in Figure 2 of the drawing. Corresponding wires 32 and 33 lead downwardly through the steering post from the rings 29 and 30. A switch 34 is mounted on the underside of the spoke 20 to disconnect the wires 23 and 24. The wires 32, 33 are designed to be connected, in any suitable manner, in the primary ignition circuit, not shown, of the automobile.

By means of the arrangement described the driver of the automobile may operate the automobile by holding his hands on the steering wheel rim 6 in such a manner as to draw both sides of the wire ring 9 toward him against the tension of the spring 10, and thereby engage both of the contactors 13 and 14 with their contacts, thereby maintaining the primary ignition circuit closed. However, should the driver fall asleep or his hands become displaced from the steering wheel from some other accidental cause, the spring 10 will draw the corresponding sections of the wire ring 9 and the balls 8 in the opposite direction and separate the contactors 13 and 14 from their contacts and thereby break the primary ignition circuit and render the engine inoperative.

Although I have shown and described herein a preferred embodiment of my invention, it is to be definitely understood that I do not wish to limit the application of my invention thereto except as may be required by the scope of the subjoined claim.

Having thus described my invention, what is claimed as new is:

A steering wheel switch comprising a steering wheel having a hub, a spoke projecting from the hub and a rim connected to the outer end of the spoke and surrounding said hub, an expansible and contractible tensioned ring surrounding and mounted on said rim, said ring including a pair of spaced relatively movable contactors, contact means disposed between and normally spaced from both contactors, opposite sides of said ring being arranged to be manually drawn toward said contact means against the tension of the ring to engage said contactors with said contact means.

FREDERICK P. DE WILDE.